United States Patent Office 3,379,666
Patented Apr. 23, 1968

3,379,666
PREPARATION OF STABLE COPOLYMERIC LATICES
Richard Oscar Becker, Wilmington, Del., assignor to E. I. du Pont de Nemours and Company, Wilmington, Del., a corporation of Delaware
No Drawing. Continuation-in-part of application Ser. No. 261,489, Feb. 27, 1963. This application Jan. 2, 1964, Ser. No. 335,407
2 Claims. (Cl. 260—29.7)

This invention relates to α-olefin hydrocarbon copolymers and, more particularly, to aqueous latices of such copolymers.

This application is a continuation-in-part of my U.S. application Ser. No. 261,489, filed Feb. 27, 1963.

The outstanding properties of chain-saturated α-olefin hydrocarbon copolymers have led to their use in a wide variety of applications. For many applications, e.g., dipped goods, tire cord adhesives and protective coatings, it may be desirable or even necessary that the copolymer be used in the form of an aqueous latex. However, since the catalysts by which these copolymers are made are sensitive to water, these copolymers are not prepared in aqueous emulsions as is customary in the trade with such well-known products as styrene-butadiene copolymers, neoprene, and the like prepared by free-radical polymerization. Further all attempts to prepare an aqueous dispersion directly from dry polymer and water lead to very poor dispersions with the polymer agglomerating into large lumps.

It is, therefore, an object of the present invention to provide a stable aqueous latex of such chain-saturated α-olefin hydrocarbon copolymers. Other objects will appear hereinafter.

Owing to the agglomeration problems encountered with these copolymers, it is quite unexpected to find that these and other objects are accomplished in accordance with this invention by a method of preparing a stable latex of a chain-saturated α-olefin hydrocarbon copolymer which comprises (I) mixing with high-shear agitation (a) an inert organic solvent solution of said copolymer, with (b) water, in the presence of (c) an emulsifying agent in an amount sufficient to form a stable oil-in-water emulsion, and (II) removing the solvent from the mixture.

The copolymers which can be used in the present invention are made by copolymerizing 2 or more α-olefins of the formula: $CH_2=CHR$ where R is H or $C_1C_{16}$ alkyl. It is preferred that these copolymers contain about 20–75 weight percent ethylene monomer units and that the other α-olefins be straight-chained.

Representative examples of useful α-monoolefins having the structure $R—CH=CH_2$ include: ethylene; propylene; 1-butene; 4-methyl-1-pentene; 1-pentene; 1-hexene; 1-heptene; 1-octene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 4,4-dimethyl-1-hexene; 5,6,6-trimethyl-1-heptene; 1-dodecene; and 1-octadecene.

Alpha-olfin copolymers and processes for the preparation are more particularly described in the following references: U.S. Patent 3,000,867; U.S. Patent 2,975,159; French Patent 1,212,527; and British Patent 857,183. Processes suitable for use in making the copolymers are described in many other U.S. and foreign patents.

A particularly preferred class of copolymers which can be employed in the present invention are the normally solid copolymers of at least one α-monoolefin and at least one non-conjugated hydrocarbon diene. The α-monoolefins are those described above having the structure $$R—CH=CH_2$$

and representative dienes include $C_5$–$C_{22}$ open-chain compounds of the formula

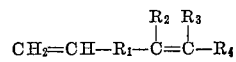

wherein $R_1$ is an alkylene radical and $R_2$, $R_3$, and $R_4$ are independently selected from the group consisting of hydrogen and alkyl radicals; $R_4$ is preferably alkyl. Examples of these dienes include: 1,4-hexadiene; 1,9-octadecadiene; 6-methyl-1,5-heptadiene; 7-methyl-1,6-octadiene; 11-ethyl-1,11-tridecadiene; 9-ethyl-1,9-undecadiene; 7-ethyl-1,7-nonadiene; 8-propyl-1,8-undecadiene; 8-ethyl-1,8-decadiene; 10-ethyl-1,9-dodecadiene; 12-ethyl-1,12-tetradecadiene; 13-n-butyl-1,12-heptadecadiene; 15-ethyl-1,15-heptadecadiene; 1,5-hexadiene; and 1,4-pentadiene. Representative cyclic non-conjugated dienes include: dicyclopentadiene; 5-alkenyl-2-norbornenes; 5-methylene-2-norbornene; 2-alkyl-2-,5-norbornadienes; 1,5-cyclooctadiene; also included is cyclopentadiene.

Representative examples of copolymers made from these α-monoolefins and the above-described non-conjugated dienes and the preparation art given in U.S. Patents 2,933,480, 3,000,866, and 3,063,973, in French Patents 1,285,090 and 1,302,960 equivalent to U.S. Patents 3,093,-621 and 3,093,620, respectively. When cyclic non-conjugated dienes are employed, it is preferred that the reaction mixture contain ethylene and at least one other α-monoolefin.

The preferred representative copolymers include: ethylene/1,4 - hexadiene; ethylene/propylene/1,4 - hexadiene; ethylene/propylene/dicyclopentadiene; ethylene/propylene/5-methylene-2-norbornene; and ethylene/propylene/2-ethyl-2,5-norbornadiene.

Water soluble organic emulsifying agents which will give oil-in-water emulsions are satisfactory for use in the present invention; the non-ionic, anionic, and cationic types are included here. Mixtures of agents may be employed when desired. The particularly preferred emulsifying agents are the non-ionic and the anionic types. Typical non-ionic agents include mono- (and di-) long-chain alkyl ethers of polyethylene ether glycol. Typical anionic emulsifying agents are the sodium salts of long-chain alkyl substituted aryl sulfonic acids, or of long-chain alkyl sulfonic acids, or of high molecular weight carboxylic acids. Further representative examples are the tertiary amine or alkylol amine salts of long-chain alkyl acid sulfate esters, alkyl sulfonic acids, or alkyl aryl sulfonic acids; and the sodium sulfates of alkylated naphthalene-formaldehyde condensation products. Cationic surface active agents, such as quaternary ammonium salts containing at least one large alkyl group (e.g., dimethylethyl-octadecyl ammonium bromide), comprise still another class of useful emulsifying agents. Amine soaps and alkali metal soaps are also suitable. Salts of the high molecular organic acids, such as tall oil and rosin, are conveniently incorporated by mixing the acid with the copolymer solution and having the requisite amount of alkali present in an aqueous mixture so as to form the emulsifier in situ.

The terminology "oil-in-water" emulsifying agents is well understood by those skilled in the art and is set out in detail in the book "Surface Activer Agents," Schwartz and Perry, Interscience Publishers, Inc. (1949), pp. 342–345, particularly p. 344. Pages 202–206 of Schwartz and Perry, supra, describe suitable non-ionic water-soluble oil-in-water emulsifying agents. Anionic emulsifying agents are set out broadly on pp. 9–12 of Schwartz and Perry, supra., and representative types are described on pp. 11 and 54 and on pp. 116–120, particularly p. 119. Further descriptions of oil-in-water emulsifying agents may be found on page 148 of Clayton's "The Theory of Emulsions and Their Technical Treatment," fifth edition by C. G. Cumner, the Blakiston Co., N.Y., 1954; pages 26, 30, 96, and 103 of "Emulsions and Foams," Berkman and Egloff, Reinhold Publishing Co., N.Y., 1941; and page 158 of "Surface Activity," Moilliet and Collie, D. Van Nostrand, N.Y., 1951. Commercially available suitable emulsifying agents are described in the book, "Detergents and Emulsifiers up to date 1962," John W. McCutcheon, Inc., 236 Mount Kemble Avenue, Morristown, N.Y., pages 11–141.

A preferred but optional ingredient in the subject composition is a colloidal stabilizer; it is usually present in the water used to make the latex. This component promotes the formation of a smoother appearing latex and tends to keep the copolymer particles from coalescing. A preferred colloidal stabilizer is ammonium caseinate. Other materials which can be used for this purpose include: sodium and ammonium polyacrylates, methylcellulose, alginates, starch, and polyvinyl alcohol.

A critical feature in the process for the preparation of the subject latex is the addition of the polymer solution to water in the presence of surface active agents under conditions of high agitation. It has been observed that if the water is added to a dry master batch of copolymer and fillers, a difficultly manageable dough results from which a satisfactory latex cannot be made. On account of the great viscosity of the dry master batch, it is impractical to attempt to add small amounts of it to rapidly agitated water.

A wide variety of organic liquids can be employed as solvents for the hydrocarbon copolymer. Frequently, it will be convenient to employ the reaction mixture obtained when the copolymer is prepared. Any of the organic solvents customarily used for this purpose are satisfactory here except that it is preferred that the solvent be volatile enough so that it can be readily removed under moderate vacuum at temperatures below about 75° C. Representative reaction media include chlorinated hydrocarbons (such as tetrachloroethylene, carbon tetrachloride, and chlorobenzene); liquid paraffins and cycloparaffins (such as neopentane, isopentane, pentane, cyclopentane, hexane, cyclohexane, heptane, 2,2,4-trimethyl pentane, methylcyclohexane, and heptane); and aromatic hydrocarbons (such as benzene, toluene, and mixed xylenes). As an alternative procedure, the copolymer can be made separately (e.g., by a solution or a slurry technique), isolated, and then dissolved in any suitable solvent by any means familiar to those skilled in the art. A particularly preferred solvent is trichloroethylene. A representative procedure is ball milling.

It is necessary to apply a suitable degree of agitation when mixing the copolymer solution with the water in the presence of the emulsifying agent to form the oil-in-water emulsion. Accordingly, the copolymer solutions should have a Brookfield viscosity at 25° C. below about 75,000 centipoises. Solutions having higher viscosities are less convenient to handle.

The amount of water employed in the formation of the emulsion is not critical. The minimum amount can be determined by routine experiments by those skilled in the art. Representative systems have used about 0.1 to 0.4 volume of water for each volume of copolymer solution. When insufficient water is employed, emulsions are obtained which are too thick for ready handling and may undergo separation or coagulation. On the other hand, dispersions which are too dilute supply an insufficient amount of copolymer for many of the customary latex applications. Enough water is supplied so that after the solvent has been removed from the emulsion, the resulting latex of copolymer in water has a solid content ranging from about 10 to 60%.

The emulsifying agent can be added either to the copolymer solution or to the water in which the copolymer solution is to be emulsified or it may be added to both or it may be formed in situ during the addition of the copolymer solution to the water (e.g., oleic acid is in the solution, triethanolamine is in the water). Agitation should be provided during the emulsification and for this purpose colloid mills or other devices familiar to those skilled in the art of latex technology may be used.

From about 1% to 10% of the emulsifying agent based on the weight of the copolymer will usually be sufficient to produce stable latices. The exact amount will depend upon the particular surface active agent employed, the type of copolymer, the proportion of water, and the like. It is to be understood that when the latices are creamed (by techniques familiar to those skilled in the art), the amount of residual emulsifying agent in the creamed latex may be less than that employed originally. Those skilled in the art can readily determine the optimum amount for a particular purpose by means of routine experiments. When a fatty acid soap is used as the emulsifying agent, care must be taken that the soap is not destroyed by acidic substances; therefore, the pH should be maintained at least as high as that of an aqueous solution of a soap if stable latices are desired. For many fatty acid soaps the pH should be at least 9.

The copolymer solution may include other components such as petroleum oils used for oil extension of the copolymer, fillers such as carbon blacks and clays, and antioxidants. Compounded latices can thus be made by the process of this invention.

A preferred procedure is to add the copolymer solution to the water; the low viscosity of the water makes it easy to attain the necessary degree of agitation. If desired, the order of addition can be reversed; however, because of the frequent high viscosity of the copolymer solution, this alternative requires additional agitation power input and is less convenient and more costly to carry out than the preferred procedure. A particularly preferred procedure involves the use of a minor proportion of an emulsification modifier, soluble in both the aqueous and the oil phase. A representative preferred example is isopropanol; less preferred alternatives are acetone or methanol. The modifier is introduced prior to the formation of the latex; preferably it is added to the oil phase, but it may be supplied to the water phase or to both phases. It should not be added to the latex because it can cause coagulation. Those skilled in the art can determine the optimum volume to employ for a particular system. The examples contain typical procedures. If too little modifier is employed, the resulting latex does not have quite as fine a particle size. If too much modifier is used, copolymer coagulum formation may become excessive.

The temperature at which the emulsion is made can be selected to suit operating convenience. Common temperatures range between about 15 and 75° C. As is well known to those skilled in the latex art, the effectiveness of the emulsifying agent may depend somewhat upon the temperature. Thus some non-ionic agents are markedly less active at temperatures above about 60–65° C.

The copolymer emulsion should be reasonably stable, e.g., for at least about two days. Emulsions stable for only a few seconds are not particularly useful; removal of the solvent can lead to the agglomeration of the copolymer to form visible crumbs instead of the latex desired.

Removal of the organic solvent can be readily accomplished by a variety of means. Application of heat or reduced pressure or a combination of the two is frequently used. Steam distillation, usually at atmospheric or subatmospheric pressure, is a preferred technique. As mentioned above, some surface active agents are not very effective above certain temperature thresholds; those skilled in the art will readily recognize that the solvent should be taken off at temperatures below these critical values in order to avoid coagulation. Thus temperatures below about 60–65° C. are often selected when non-ionic emulsifying agents are used alone. Optimum values for the pressure and temperature can be readily obtained by empirical experiments carried out by known procedures according to those skilled in the art.

In place of the aqueous solution of emulsifying agent and the like one can employ an aqueous latex such as the conventional latices of the diene polymers. A representative example of this type is a polychloroprene latex (e.g., "neoprene type 571"). The solids contents of any of these latices is not critical except in that it should not be so high as to impede the attainment of satisfactory application.

This invention will now be described in and by the following examples of specific embodiments wherein parts and percentages are by weight unless otherwise specified.

EXAMPLE I

An inert organic solvent solution of an ethylene/propylene/1,4-hexadiene copolymer is prepared by forming a master batch of the copolymer and dissolving the master batch in the solvent. The components of the master batch are prepared and selected as follows:

The sulfur-curable ethylene hydrocarbon copolymer is made by reacting ethylene, propylene, and 1,4-hexadiene in tetrachloroethylene solution in the presence of a vanadium oxytrichloride/diisobutyl aluminum monochloride catalyst according to the general procedure of U.S. Patent 2,933,480.

This copolymer exhibits a Mooney viscosity (ML-4/100° C.) of 80 to 90 and has the following monomer unit composition by weight: 40–45% propylene, 3.5–4.5% 1,4-hexadiene, the remainder being ethylene.

A naphthenic peteroleum oil (commercially available from Sun Oil Co., as Circo Light Process Oil) is selected having a flash point of 330° F., a viscosity-gravity constant of 0.887, a specific gravity at 60° F. of 0.9242, a SSU viscosity at 210° F. of 40.3 seconds, the sum of the percent N bases and first acidaffins is less than 15, and the carbon atoms are distributed as follows: 20% aromatic, 40% naphthenic and 40% paraffinic.

A bentonite clay of the so-called "northern" or "true" or "sodium' 'or "alkali" bentonite type is selected which can adsorb large quantities of water while swelling as much as 30-fold in volume. It has the property of remaining in suspension in dilute aqueous dispersions. It is capable of passing through a 325-mesh sieve, the grade being as coarse as 200-mesh.

A terpene resin (commercially available from the Pennsylvania Industrial Chemical Corp. as "Piccolyte S–85") is selected which is a thermoplastic hydrocarbon terpene resin composed essentially of polymers of pinene, especially beta-pinene. It has a melting point of about 85° C., an acid number less than 1, and a saponification number less than 2. It is soluble in petroleum solvents, mineral oil and chlorinated hydrocarbons; it is insoluble in ketones, esters, short-chain alcohols, and water. The specific gravity is in the range of 0.93–0.99.

A master batch having the following composition is prepared on a rubber roll mill at 75–100° F.

| Component: | Parts by weight |
|---|---|
| Copolymer | 300 |
| Bentonite clay | 60 |
| Terpene resin | 180 |
| Naphthenic petroleum oil | 120 |
| Oleic acid | 90 |

About 25 parts by weight of the master batch prepared above are added to 110 parts of trichloroethylene at 25° C. and dispersed therein by rolling the composition overnight on high-speed rollers.

An aqueous solution is prepared by dissolving 134.4 parts of triethanolamine and 192 parts of a 10% aqueous ammonium caseinate solution in 633.6 parts of distilled water.

The stable emulsion of the copolymer is prepared by adding 2400 parts of the compounded elastomer solution to 960 parts of the aqueous solution in a homogenizer under conditions of rapid agitation. The emulsifying agent is formed in situ by the oleic acid and the triethanolamine. A smooth aqueous dispersion forms after about ½ hour which is then stripped of solvent under vacuum at 44–55° C. A stable compounded latex results having a Brookfield viscosity of about 100 centipoises at 75° F. and a total solids content of 38%.

EXAMPLE II

A copolymer solution is formed by mixing 100 parts by weight of the copolymer of Example I and 30 parts by weight of oleic acid on a rubber roll mill at 75–100° F. The composition thereby obtained is dissolved in 1100 parts by weight of trichloroethylene at 25° C. by agitation in the manner described in Example I.

An aqueous solution is prepared by dissolving 67 parts by weight of triethanolamine and 9.6 parts by weight of ammonium caseinate in 316 parts by weight of water.

The latex is made by adding the trichloroethylene solution prepared above to the aqueous solution with rapid agitation and removing the trichloroethylene from the resulting emulsion under vacuum at 50° C. The latex is stable and has a total solids content of about 22% and a Brookfield viscosity of about 60 centipoises at 75° F. Again, the emulsifying agent is formed in situ.

EXAMPLE III

A copolymer solution is prepared by dissolving the copolymer of Example I in trichloroethylene in the ratio of 100 parts of copolymer per 1100 parts of solvent.

The following emulsifying agents are selected for preparation of the aqueous solution:

A. An anionic surface active agent ("Triton X–202" commercially available from the Resinous Products Division of Rohm & Haas Co.). It comprises an aqueous dispersion about 30% active ingredients of a sodium salt of an alkyl aryl polyether sulfonate.

B. An anionic surface active agent ("Darvan No. 1" commercially available from the R. T. Vanderbilt Co., Inc.). It is used as a 10% aqueous dispersion of a sodium salt of polymerized alkyl naphthylene sulfonic acid.

C. A non-ionic surface-active agent ("Carboxane G–3" commercially available from Textilana Corp.). It is a liquid (100% active ingredient) comprising a fatty amide ethoxylate.

D. An anionic surface active agent ("Acrysol GS" commercially available from the Resinous Products Division of Rohm & Haas Co.). It is supplied as an aqueous dispersion (12.5% solids) of a sodium polyacrylate.

E. A non-ionic surface-active agent ("Alrosol" commerically available from the Geigy Industrial Chemicals Division of Geigy Chemical Corp.). It is a free-flowing amber liquid (87% active ingredient) comprising a fatty alkanolamide condensate.

F. An anionic surface active agent ("Benox 2–Al" commercially available from the Dow Chemical Co.). It is supplied as a 90% dispersion of sodium dodecyl diphenyl oxide disulfonate in water.

G. A non-ionic surface active agent ("Nalco L–357" commercially avalable from the Nalco Co.). This material is a polyoxyethylated vegetable oil.

H. An anionic surface-active agent ("Aquarex ME" commercially available from the Du Pont Company). This compound is a sodium salt of sulfated mixed $C_{12}$, $C_{14}$, and $C_{16}$ alcohols. It is dispersed in water to give a 10% active ingredient solution.

I. A non-ionic surface active agent ("Emulphor ON 870" commercially available from Antara Chemicals). It is a polyoxyethylated fatty alcohol and has a specific gravity of 1.03–1.04.

Eleven aqueous solutions are prepared according to the following recipes (parts by weight):

| Component | Solution | | | | | | | | | | |
|---|---|---|---|---|---|---|---|---|---|---|---|
|  | 1 | 2 | 3 | 4 | 5 | 6 | 7 | 8 | 9 | 10 | 11 |
| A | 12 | 6 | 6 | 6 |  |  | 12 | 12 |  | 40 |  |
| B | 30 |  |  |  | 20 |  |  | 30 |  |  |  |
| C |  |  | 3 | 3 |  |  |  |  |  |  |  |
| D |  |  |  |  | 8 |  | 8 |  |  |  |  |
| E |  | 2.2 | 2.2 | 2.2 | 2.2 |  | 2.2 |  |  |  |  |
| F |  |  | 2.2 | 2.2 |  |  |  |  |  |  |  |
| G |  |  |  |  |  |  |  | 2 |  |  |  |
| H |  |  |  |  |  |  |  |  | 40 |  | 20 |
| I |  |  |  |  |  |  |  |  |  |  | 20 |
| Extra Water | 110 | 90 | 140 | 100 | 150 | 180 | 130 | 108 | 260 | 260 | 260 |

1100 parts of the copolymer solution are added to each of the aqueous solutions while the latter are being rapidly agitated at 25° C. The resulting emulsions are heated at 50° C. under vacuum to remove the trichloroethylene. In every case a stable latex was obtained, those made according to recipes 4, 6, 11 being particularly suitable.

EXAMPLE IV

About 1200 parts of the copolymer solution of Example III are added under conditions of rapid agitation at 25° C. to an aqueous medium consisting of 12 parts of emulsifying agent A ("Triton X–202"), 2 parts of emulsifying agent E ("Alrosol"), 200 parts of a 50% solids polychloroprene latex having a specific gravity of 1.10 and exhibiting a pH of 12.2 at 25° C. ("neoprene latex type 571"), and 95 parts of water. A latex of excellent stability is obtained after the trichloroethylene has been removed from the resulting aqueous dispersion at 50° C. under vacuum.

EXAMPLE V

A copolymer solution having a Brookfield viscosity of 5200 centipoise at 33 centigrade is prepared by dissolving the copolymer of Example I in trichloroethylene according to the procedure of Example I in the ratio of 100 parts of copolymer per 1100 parts of solvent.

Thirteen aqueous compositions are prepared according to the following recipes at 25° C.:

| Component | Solution | | | | | | | | | | | | |
|---|---|---|---|---|---|---|---|---|---|---|---|---|---|
|  | 1 | 2 | 3 | 4 | 5 | 6 | 7 | 8 | 9 | 10 | 11 | 12 | 13 |
| Neoprene Latex of Ex. IV | 100 | 100 | 100 | 200 | 200 | 200 | 200 | 200 | 200 | 200 | 200 | 200 | 200 |
| A | 12 | 12 | 12 | 12 |  |  | 24 | 24 | 24 | 24 | 24 | 24 | 24 |
| B | 30 |  |  |  | 40 |  |  | 60 |  |  |  |  |  |
| C |  |  | 6 | 6 |  |  |  |  |  |  |  |  |  |
| D |  |  |  |  | 16 |  |  | 16 |  |  |  |  |  |
| E |  |  |  | 4.4 | 4.4 | 4.4 | 4.4 |  |  | 4 | 4 |  | 4 |
| F |  |  |  |  | 4.4 | 4.4 |  |  |  |  |  |  |  |
| G |  |  |  |  |  |  |  | 4 |  |  |  |  |  |
| Ammonium Caseinate |  |  |  |  |  |  |  |  |  |  |  |  | 60 |
| Extra Water | 60 | 84 | 180 | 168 | 151.2 | 175.2 | 168 | 116 | 0 | 180 | 0 | 180 | 110 |

Components A–G are defined in Example III.

About 1100 parts of the copolymer solution are added to each of these aqueous compositions while the latter are being rapidly agitated at 25° C. The resulting emulsions are heated at 50° C. under vacuum to remove the tircolorethylene. Stable latices are obtained, those of 4 and 6 being particularly attractive.

EXAMPLE VI

An ethylene/1,4-hexadiene copolymer is prepared according to the general procedures of U.S. Patent 2,933,480 in tetrachloroethylene solution using a diisobutyl aluminum chloride/vanadium tris(acetylacetonate) catalyst. The copolymer exhibits an inherent viscosity of 1.39 (measured on a 0.1% weight solution in tetrachloroethylene at 30° C.) and contains about 2.84 gram-moles of carbon-carbon double bonds per kilogram.

Twenty grams of the ethylene/1,4-hexadiene copolymer and 490 milliters of carbon tetrachloride are placed on a glass jar which is then rotated on a set of moving rollers at 25° C. for about two hours. The mixture is heated at 60° C. for one hour and then vigorously shaken. The resulting solution is added to an Eppenbach Homomixer containing a vigorously agitated aqueous solution, prepared by dissolving 0.8 gram apiece of the surfactant E ("Alrosol DX–2310") and F ("Benax 2–Al") of Example III in 122 milliliters of water at 25° C. In 3 minutes a good emulsion is obtained. After being allowed to stand overnight at 25° C., the emulsion is again agitated in the Homomixer for 5 minutes. The carbon tetrachloride is then removed by stirring the emulsion at 40° C. under vacuum of about 10 mm. Hg for 3 hours. The latex has a solids content of about 20–25% by weight. The particle size distribution appears satisfactory, roughly 90–95% of the latex particles having a diameter less than 0.2 micron; of the remaining particles most are about 0.2–0.3 micron in diameter and a few are between 3 and 4 microns.

EXAMPLE VII

Example VI is repated except that the ethylene/1,4-hexadiene is replaced by the copolymer of Example I. The latex obtained contains particles generally in the 1–2 micron range. They appear to be more tightly packed than those of the latex prepared in Example VI.

EXAMPLE VIII

A copolymer solution is prepared from the ethylene/1,4-hexadiene copolymer described in Example VI above by dissolving 20 grams in 490 ml. of carbon tetrachloride. This solution is emulsified in a Homomixer with an aqueous solution containing 78 mg. of potassium hydroxide, 122 ml. of water and an anionic emulsifying agent ("Empol 1022") which is a $C_{36}$ dibasic dimer acid producted by the polymerization of unsaturated fatty acids, acid value 180, saponification value 185, neutralization equivalent 290–310 (commercially available from Emery Industries, Inc.). The emulsion is transferred to an agitated 3-neck flask where the carbon tetrachloride is taken off under reduced pressure (10 mm. Hg). The resulting latex (20% solids content) becomes spontaneously creamed on standing at room temperature for about 3 days.

EXAMPLE IX

A copolymer solution is prepared by dissolving 24 parts of the copolymer of Example I in 276 parts of trichloroethylene according to the general procedure of the latter example.

A cationic surface-active agent ("Intracol R" commercially available from Synthetic Chemicals, Inc.) is selected which is a long-chain fatty acid amide containing multiple amino groups.

A latex is prepared by adding the copolymer solution to a rapidly agitated solution of 1 part of the above surfactant in 65 parts of water at 25° C. and removing the trichloroethylene from the resulting emulsion at 50° C. under vacuum. A satisfactory latex is obtained.

EXAMPLE X

Example IX is essentially repeated except that the copolymer solution contains 18 parts of the copolymer of Example I in 582 parts of tetrachloroethylene.

The surfactant selected is a cationic surface-active agent ("Hyamine 2389" commercially available from Rohm & Haas, Inc.) comprising a mixture of $C_9$–$C_{15}$ alkyl tolyl methyl trimethyl ammonium chlorides.

The latex prepared is quite stable and satisfactory in all respects.

EXAMPLE XI

A solution of 1.5 g. (3 phr.) of "Igepal CO–530" (surfactant made by condensing 6 moles of ethylene oxide with one mole of nonylphenol; commercially available from Antara Chemicals, a division of General Aniline & Film Corp.) in 100 ml. isopropyl alcohol is added slowly with stirring to 500 g. of a 10% solution of ethylene/propylene/1,4-hexadiene copolymer in n-hexane. The copolymer is made in tetrachloroethylene with a diisobutyl aluminum chloride/vanadium oxytrichloride catalyst in accordance with the general procedures set out in U.S. Patent 2,933,480 and exhibits a Mooney viscosity (ML–4/250° F.) of about 40 and has the following monomer unit composition by weight: ethylene, 52%; propylene, 44%; 1,4-hexadiene, 4%. The resultant copolymer solution is added during 4 min. to a solution of 8 ml. (4 phr.) "Tergitol 7" (a 25% solution of the sodium sulfate derivative of 3,9-diethyl-tridecanol-6) in 300 ml. water with agitation by an Eppenbach homomixer. The emulsion is homogenized an additional 5 min. after polymer solution addition is complete. The white milky emulsion is stripped of organic solvent and a portion of the water by distillation at 50° C. Pressure is gradually reduced during a 45 min. period to 30 mm. Hg and maintained at that value for 30 min. The distillate removed consists of about 625 ml. of an organic layer and 110 ml. of an aqueous layer. Coagulum of about 0.4% (based on polymer) results from this treatment. The latex formed has a pH of about 8.8 and a solids content of about 22.1%. The particle size varies between about $0.02\mu$ and $5\mu$ as determined by electron microscopy.

EXAMPLE XII

A 12.5 ml. portion of 1% sodium alginate solution (0.25 phr.) is added with stirring to a dilute latex prepared by the procedure of Example XI. The resultant mixture is allowed to cream overnight. The creamed latex has a solids content of about 52.8%; Brookfield viscosity of this material is about 50 cps. at 26° C. Particle size of the creamed latex ranges from $<0.3\mu$ to $4\mu$ in diameter as determined by microscopic examination. The serum formed during the creaming operation contains about 5.2% solids.

EXAMPLE XIII

A solution of 1.5 g. (3 phr.) "Igepal CO–530" in 100 ml. isopropyl alcohol is added slowly with stirring to 650 g. of a 10% solution of the copolymer of Example XI in n-hexane at 26° C. The resulting solution is added during a 4 minute interval to a solution containing 300 g. water, 8 ml. "Tergitol 7" (4 phr.) and 12.5 ml. of 1% solution of sodium alginate (0.25 phr.) at 26° C. Vigorous agitation is provided by an Eppenbach homomixer during the addition of the polymer solution and for 5 min. thereafter. The white milky emulsion which forms is stripped of volatile organic solvents and a portion of the water by distillation at 50° C. Pressure is gradually reduced to 30 mm. Hg over 1¾ hours. The distillate removed consists of about 970 ml. of an organic layer and 95 ml. of an aqueous layer. Coagulum of about 3.6% (based on polymer) forms during the stripping operation. The latex immediately after solvent removal has a solids content of about 17.6%. It is permitted to cream overnight; solids content of the creamed layer is about 47.9%; solids content of the serum is about 4.7%. Particle size of the creamed latex ranges from about $<0.3\mu$ to $4\mu$ as determined by microscopic examination.

EXAMPLE XIV

The copolymer selected is a copolymer having the same composition as that of Example XI but differing in being of higher viscosity (ML–4/250° F.=70); it is prepared essentially the same way except for a decrease in the catalyst concentration in the reactor. A 500-g. sample of this copolymer (10%) in hexane is added during 3 min. to a solution of 0.50 g. (1 phr.) "Aquarex ME" (see Ex. III) and 2.0 g. (4 phr.) "Igepal CO–630" (surfactant made by condensing 9–10 moles of ethylene oxide with one mole of nonylphenol; commercially available from Antara Chemicals) in 300 ml. water. Agitation is provided by an Eppenbach homomixer during polymer addition and for 5 min. thereafter. Hexane is removed from the emulsion by distillation at 42–45° C.; the pressure is gradually reduced to 40 mm. Hg and maintained at that value for 30 min. A total of about 580 ml. of distillate is collected; about 6.8% (based on polymer) coagulum forms during the operation. A 20 ml. portion of 1% sodium alginate solution (0.4 phr.) is added, with stirring, to the resultant latex and the mixture is allowed to stand overnight. The creamed latex has a solids content of about 52.4%. The particle size varies from about $<0.3\mu$ to $7\mu$ in diameter as determined by microscopic examination.

EXAMPLE XV

A solution of 1.37 g. (3 phr.) "Igepal CO–530" in 80 ml. isopropyl alcohol is added slowly, with stirring at 26° C. to 400 g. of an 11% hexane solution of a hydrocarbon elastomer having the composition: ethylene, 52.7%; propylene, 42%; dicyclopentadiene, 5.3%. The resultant polymer solution is added during 4 min. to a solution of 300 g. water and 7.5 ml. "Tergitol 7" (4 phr.) at 26° C. Vigorous agitation is provided by an Eppenbach homomixer during polymer solution addition and for 7 min. thereafter. Organic solvents are removed from the fluid emulsion by distillation at 50° C. under a pressure which is gradually reduced to 40 mm. Hg and maintained at that value for 30 min. The distillate consists of about 480 ml. of an organic layer and an aqueous layer of 95 ml. Coagulum of about 0.13 g. (0.3% based on polymer) forms during solvent removal. The latex which results contains about 14.8% solids, and has a pH of 9.1. The particle size of the disperse phase extended from $0.02\mu$ to $1\mu$ in diameter as determined by electron microscopy.

EXAMPLE XVI

A solution of 1.2 g. (3 phr.) "Igepal CO–530" in 100 ml. isopropyl alcohol is added at 26° C. to 500 g. of an 8.6% cyclohexane solution of a hydrocarbon elastomer dipolymer composed of about 69% ethylene and 31% 1,4-hexadiene. The resultant polymer solution is added during 5 min. to a solution of 6.5 ml. "Tergitol 7" (4 phr.) and 300 ml. water. Agitation is provided by an Eppenbach homomixer during polymer solution addition and for 7 min. thereafter. Volatile solvents are removed from the emulsion by distillation at 50° C. under a pressure which is reduced over 1 hour to 8 mm. Hg and maintained at that pressure for 20 min. Approximately 0.6 g. (1.4% based on polymer) of coagulum forms during solvent removal. The resultant latex has a solids content of about 18.2% and exhibits a pH of about 9.1. The particle size varies from about $<0.3\mu$ to $3\mu$ in diameter as determined by microscopic examination.

EXAMPLE XVII

A 100-ml. portion of isopropyl alcohol was added slowly, with stirring, to 500 g. of a 10% n-hexane solution of the copolymer of Example XVI at 26° C. The resultant polymer solution is added during 4 min. to a solution of 2.5 g. (5 phr.) trimethylcetylammonium bromide in 300 ml. water at 26° C. with agitation by an Eppenbach homomixer. The emulsion is homogenized an additional 5 min. after polymer addition is complete. The emulsion is stripped of organic solvent and a portion of the water by distillation at 50° C. The pressure on the distillation is decreased to 60 mm. Hg during a ½-hour period and held at that pressure for 1 hour. The distillate consists of a 655-ml. layer of organic material and a 65-ml. layer of aqueous material. Coagulum of about 5% (based on polymer) forms during this procedure. The solids content of the resultant latex is about 10.7%. The particle size of the emulsoid ranges from $<0.3\mu$ to approximately $3\mu$ in diameter as determined by microscopic examination.

EXAMPLE XVIII

A solution of 0.72 g. (3 phr.) "Igepal CO-530" in 50 ml. isopropyl alcohol is added slowly with stirring to 600 g. of a 4% trichloroethylene solution of the copolymer of Example XIV at 26° C. The resultant polymer solution is added during 3 min. to a solution of 2.9 ml. "Tergitol 7" (3 phr.) in 300 ml. water at 26° C. Vigorous agitation is provided by an Eppenbach homomixer during polymer solution addition and for 4 min. thereafter. The milky emulsion is stripped of organic solvent and a portion of the water by distillation at 50-57° C. and 8 mm. Hg during 60 minutes. The distillate removed consists of about 355 ml. of an organic layer and of 110 ml. of an aqueous layer. Coagulum of about 2.5% (based on polymer) forms during this treatment. The resulting latex has a solids content of about 20.5% and its Brookfield viscosity is about 10 cps. The particle size of the disperse phase ranges from $<0.3\mu$ to about $8\mu$ in diameter as determined by microscopic examination.

EXAMPLE XIX

A solution of 1.5 g. (3 phr.) cetyl alcohol in 100 ml. isopropyl alcohol and 25 ml. hexane and a 5.3-ml. portion of oleic acid (1 M) solution (3 phr.) in hexane are added slowly with stirring to 500 g. of a 10% n-hexane solution of the copolymer of Example XI. The resultant polymer solution is added during 4 min. to a solution of 300 g. water containing 5.3 ml. of sodium hydroxide (1 M) solution. Agitation is provided by an Eppenbach homomixer during polymer solution addition and for 8 min. thereafter. The resultant fluid emulsion is stripped of organic solvents by distillation at 50° C. under pressure which is gradually reduced to 60 mm. Hg over a 2.5-hr. period. The distillate consists of about 655 ml. of an organic layer and 140 ml. of an aqueous layer. Coagulum of 4.3 g. (8.5% based on polymer) formed during this solvent stripping operation. The latex remaining after solvent removal contains about 20.8% solids, it has a Brookfield viscosity of about 20 cps. at 26° C., and its pH is about 9.2. The particle size of the disperse phase varies from $<0.3\mu$ to about $3\mu$ in diameter as determined by microscopic examination.

The latices made by the present invention are quite satisfactory for use in many dipping and coating operations. Two representative applications are the coating of paper and of leather.

The latex can be used to treat sheets of paper or sides of leather by any of the well-known techniques, e.g., the paper can be immersed in a latex bath and the excess latex later removed by blotting the impregnated paper. The amount of copolymer needed for optimum results in treating the paper will depend upon the nature of the paper, the $\alpha$-olefin hydrocarbon copolymer, and the application intended for the treated paper. The proper choice can be readily determined by those skilled in the art using empirical experiments. After the paper has become impregnated it is dried and cured. Drying is often conveniently accomplished by placing the paper in a 100° C. oven for about 10 to 30 minutes.

The leather can be treated by conventional techniques such as roller coating, brushing, swabbing, spraying, and the like. It is preferable to treat the leather at room temperature, i.e., 20° to 30° C. However, temperatures as high as 60° to 65° may prevail. The degree of impregnation to be attained will depend upon the end use of the leather. Leather so treated may be used as shoe material, belting and the like.

The cationic latices of this invention can be incorporated into Portland cement to improve the properties thereof, e.g., adhesion.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A method of preparing a stable latex of a water-insoluble, chain-saturated hydrocarbon copolymer selected from the group consisting of (1) ethylene/1,4-hexadiene copolymers, (2) ethylene/propylene/1,4-hexadiene copolymers, and (3) ethylene/propylene/dicyclopentadiene copolymers, which process comprises (I) forming a stable oil-in-water emulsion by mixing with high-shear agitation at a temperature between 15° and 75° C. (a) an inert organic solvent solution of said copolymer, said solution having a Brookfield viscosity at 25° C. below about 75,000 centipoise, with (b) water containing a colloidal stabilizer selected from the group consisting of ammonium caseinate, sodium and ammonium polyacrylates, methyl cellulose, alginates, starch and polyvinyl alcohol, in the presence of (c) an emulsifying agent in an amount of from about 1 to 10% based on the weight of said copolymer present, the volumetric ratio of (b) to (a) ranging from about 1:10 to 4:10 and wherein at least a part of said water (b) is introduced in the form of an aqueous polychloroprene latex; and (II) removing the solvent from the mixture at a temperature below about 75° C.

2. A stable latex produced by the process of claim 1.

References Cited

UNITED STATES PATENTS

| | | | |
|---|---|---|---|
| 2,910,451 | 10/1959 | Cantwell | 260—889 |
| 2,912,401 | 11/1959 | Aldridge et al. | 260—29.7 |
| 3,000,866 | 9/1961 | Tarney | 260—80.5 |
| 2,822,341 | 2/1958 | Miller et al. | 260—29.7 |

MURRAY TILLMAN, *Primary Examiner.*

J. ZIEGLER, J. T. GOOLKASIAN, *Assistant Examiners.*